United States Patent [19]

Okuyama et al.

[11] 4,435,907
[45] Mar. 13, 1984

[54] MACHINE BODY INCLINATION DETECTOR DEVICE

[75] Inventors: Shigeaki Okuyama, Kawachinagano; Norimi Nakamura; Osami Hashimoto, both of Sakai, all of Japan

[73] Assignee: Kubota, Ltd., Osaka, Japan

[21] Appl. No.: 338,511

[22] Filed: Jan. 11, 1982

[30] Foreign Application Priority Data

Jan. 13, 1981 [JP] Japan ............................... 56-3647[U]

[51] Int. Cl.³ .......................... G01C 9/06; G01C 9/18
[52] U.S. Cl. ....................................... 33/366; 33/333; 33/378; 340/689
[58] Field of Search ......................... 33/333, 366, 378; 340/689

[56] References Cited

U.S. PATENT DOCUMENTS

| | | | |
|---|---|---|---|
| 2,500,411 | 3/1950 | Hewitt, Jr. ........................... | 33/378 |
| 3,559,294 | 2/1971 | Bauer .................................... | 33/366 |
| 3,660,840 | 5/1972 | Plofchan ............................... | 33/366 |
| 3,776,315 | 12/1973 | Gill et al. ............................ | 33/366 |
| 3,842,512 | 10/1974 | Stoltz et al. ......................... | 33/378 |
| 4,063,366 | 12/1977 | Bane ...................................... | 33/366 |
| 4,278,854 | 7/1981 | Krause .................................. | 340/689 |

FOREIGN PATENT DOCUMENTS

| | | | |
|---|---|---|---|
| 605084 | 4/1978 | U.S.S.R. ............................... | 33/366 |
| 685910 | 9/1979 | U.S.S.R. ............................... | 33/366 |
| 714147 | 2/1980 | U.S.S.R. ............................... | 33/366 |

*Primary Examiner*—Richard R. Stearns
*Attorney, Agent, or Firm*—Cushman, Darby & Cushman

[57] ABSTRACT

A machine body inclination detector device for detecting change in position of a float with respect to a machine body according to the inclination of the machine body. The float is constructed such that the buoyancy of the float does not undergo a great change even though the liquid level is inclined.

9 Claims, 6 Drawing Figures

MACHINE BODY INCLINATION DETECTOR DEVICE

BACKGROUND OF THE INVENTION

1. Field of the Invention

The present invention relates to a machine body inclination detector device for detecting change in position of a float with respect to a machine body according to the inclination of the machine body.

2. Description of the Prior Art

There is conventionally known a device for detecting the inclination of a machine body as disclosed in Japanese Patent Publication No. SHO 54-39302, in which a vertical movement of floats floating in a U-tube effects an opening/closing operation of lead switches, which are a kind of proximity switch, disposed adjacent this U-tube, and according to such operation, horizontal control of, for example, a rotary working machine can be performed.

SUMMARY OF THE INVENTION

In view of the foregoing, it is an object of the present invention to restrain an over-movement of a float following the flow of a liquid, thereby to improve precision of detecting the inclination of the machine body.

A machine body inclination detector device for detecting the inclination of a machine body in accordance with the present invention comprises a container fixed to the machine body having a liquid therein, a float floating in the liquid and constructed such that the buoyancy of the float undergoes less change as compared with the weight of the float even though the liquid is inclined by the inclination of the machine body, and means for detecting the inclination of the float.

According to the present invention, the restoring force of the float resulting from its buoyancy at the time the liquid is inclined, can be made very small as compared with the static inertial force of the float, thus restraining overmovement of the float resulting from its inertia followed by the flow of the liquid, so that precision of detecting the inclination of the machine body may be improved.

Other objects and advantages of the present invention will be apparent from the following detailed description.

BRIEF DESCRIPTION OF THE DRAWINGS

The present invention will be further discussed, by way of example, with reference to the accompanying drawings, in which.

DESCRIPTION OF THE PREFERRED EMBODIMENTS

Figure 1:
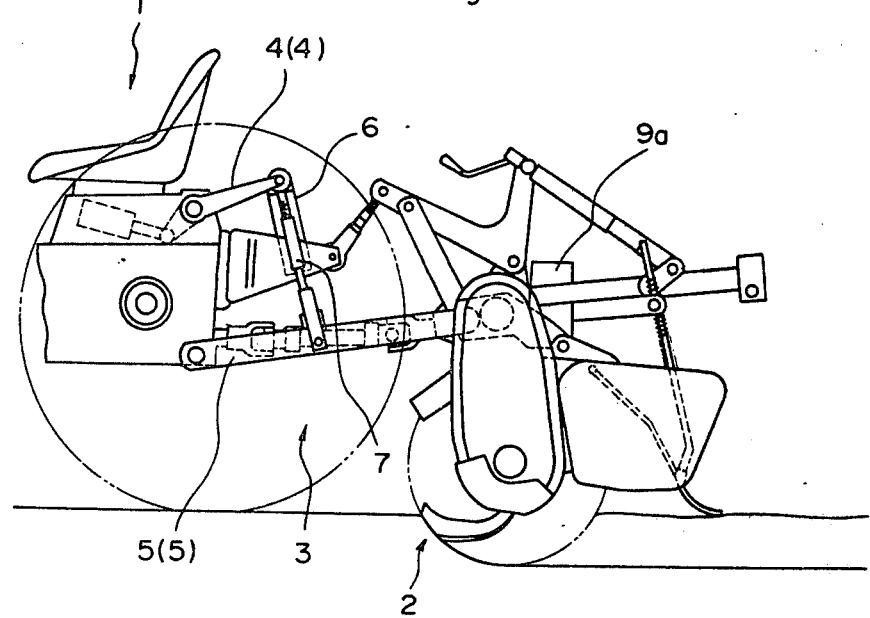
FIG. 1 is side view of a rear portion of a riding cultivator to which a machine body inclination detector device in accordance with the present invention is applied.

As shown in FIG. 1, a riding cultivator is formed in such a way that a side-drive type rotary cultivator 2 is connected in a vertically movable manner to the rear portion of a riding tractor 1 by a link mechanism 3 such that a rotary power is transmitted from the tractor 1 to the cultivator 2.

In the link mechanism 3, one of a pair of lift arms 4 is pivotally connected to one of a pair of lower links 5 by a hydraulic cylinder 6, and the other of lift arms 4 is pivotally connected to the other of lower links 5 by a rod 7. Thus, since the lower link 5 may be swung by the cylinder 6 and the link mechanism 3 is pivotally connected to the cultivator 2, the cultivator 2 may effect a rolling operation with respect to the tractor 1.

Figure 2:
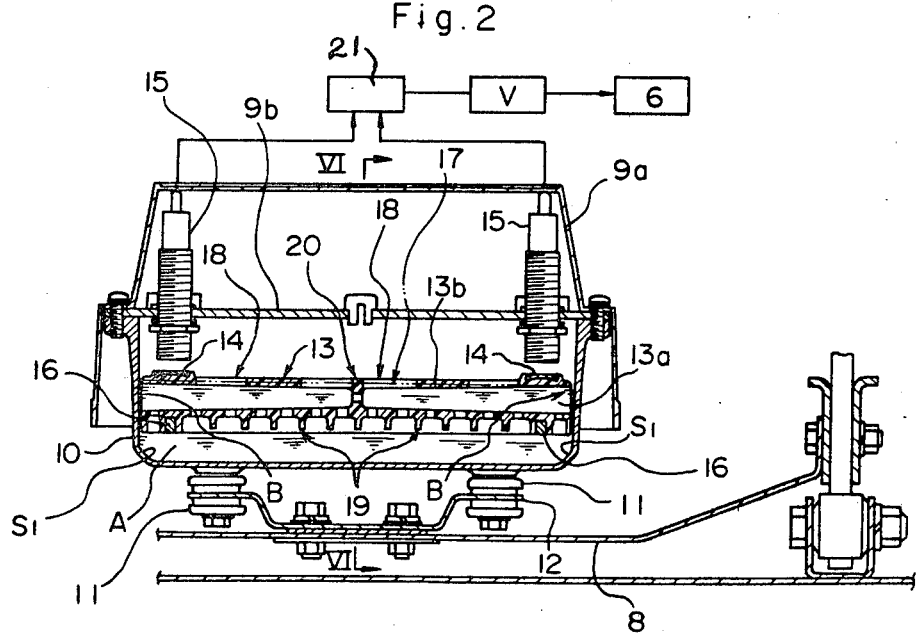
FIG. 2 is a section view of the inclination detector device mounting portion in FIG. 1.
Figure 3:
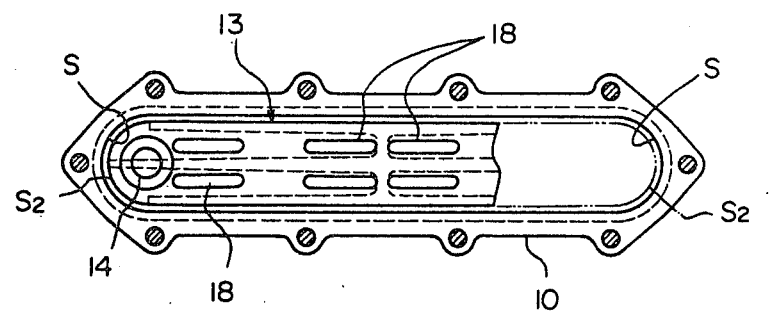
FIG. 3 is a plan view, with portions broken away, of a float used in the machine body inclination detector device.
Figure 4:
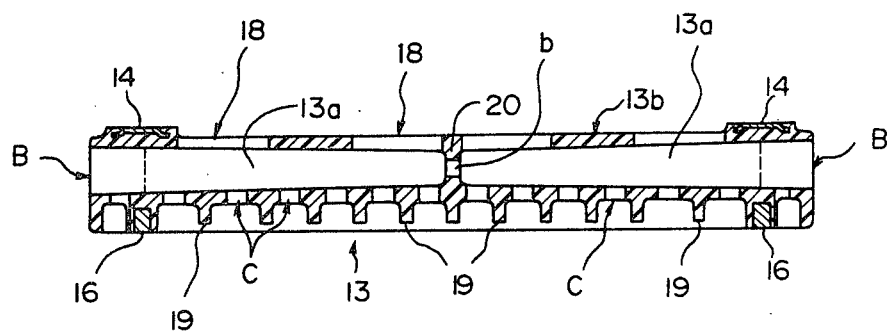
FIG. 4 is a longitudinal section view of the float in FIG. 3.
Figure 5:
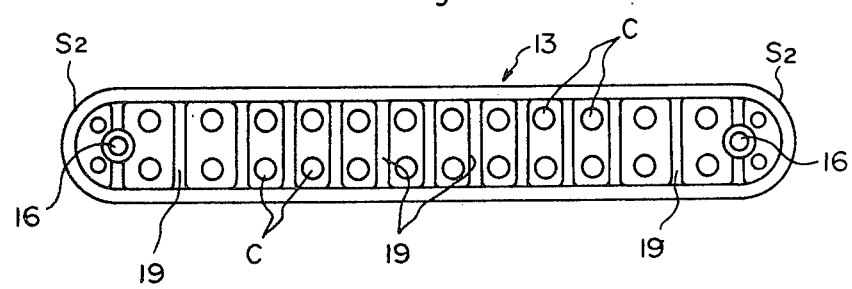
FIG. 5 is a bottom view of the float in FIG. 3.

In the cultivator 2 as shown in FIG. 2, a cast container 10 having a cover 9a and openable lid 9b is attached to a machine frame 8 through rubber cushions 11 such that the container 10 and the frame 8 may be integrally swung. The container 10 contains a float 13 and an antifreeze solution for radiator A having a specific gravity of about 1.072.

The cast container 10 has a length permitting the float 13 to longitudinally move freely in the container 10 with the distance between the container 10 and the float 13 formed as small as possible, and a width slightly larger than the width of the float 13, so that the horizontal moving amount of the float 13 in the container 10 is small.

In the plan view of the container 10, the inner corners of both longitudinal ends of the container 10 are formed in a concave shape S. In the longitudinal section view of the container 10, the inner corners of the lower portions of the both longitudinal ends of the container 10 are formed in a concave shape S1.

Figure 6:
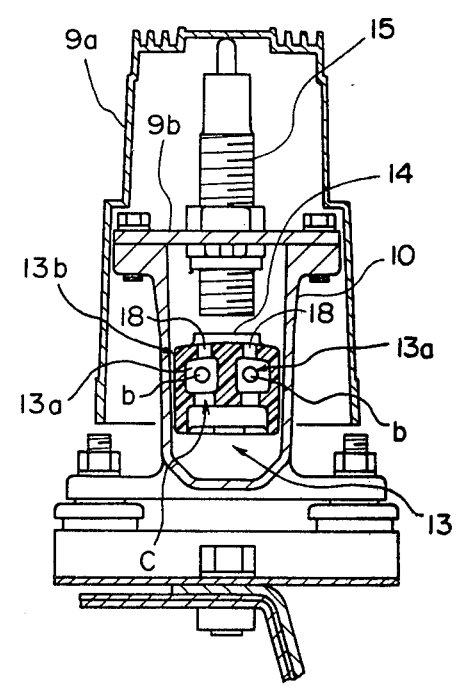
FIG. 6 is a section view taken along the line VI—VI in the direction of the arrow in FIG. 2.

As shown in FIGS. 3 to 6, the float 13 is formed in a single slender shape having a substantially rectangular section at the widthwise side at right angle to the longitudinal side, and the top surface of the widthwise side of the float 13 is convex at the center portion thereof (FIG. 6). The float 13 is provided at the longitudnal ends thereof with openings B through which the antifreeze solution A of the contained liquid flowing into the float 13. The float 13 has at the lower side of the lower wall thereof a plurality of ribs 19 which are spaced in the longitudinal direction.

The float 13 has a pair of portions 14 to be detected made of a steel plate which are located at longitudinally spaced positions. Attached to the openable lid 9b are a pair of proximity switches 15 adapted to be respectively closed or opened by the portions 14 to be detected which are swingly inclined according to the inclination of the machine body. The float 13 is made of polypropylene having a specific gravity of about 0.90 to 0.92. The float 13 has hollow portions 13a into which the antifreezing solution A flows through the openings B and C. Further, the float 13 has a pair of metallic weights 16 such that a major portion of the lower part of the float 13 is sank in the antifreezing solution A with the top surface 13b of the float 13 being adjacent to or projecting slightly from the level 17 of the antifreezing solution A. The float 13 is thus constructed such that the restoring force of the float 13 resulting from the change in its buoyancy at the time the liquid level is inclined with respect to the float 13 following the inclination of the machine body 1, becomes very small as compared with the inertial force or mass of the float 13.

The float 13 is provided in the top wall thereof with holes 18 to remove the air entering into the hollow portions 13a which surface on the liquid level 17 according to the swing of the machine body. Thus, the air entering into the float 13 is removed, thereby to prevent penetrating an erroneous operation of the float 13 due to the air entering into the float 13.

The float 13 has end corners of the convex shape S2 substantially corresponding to the concaved shape S of the container 10. Thus, even if the container 10 is moved in the lengthwise/widthwise composite direction, the float 13 is not caught by the inner surface of the container 10. At the longitudinally intermediate part of each hollow portion 13a, there is integrally formed a partition wall 20 having therein a small bore b for the flow of the solution. Thus, the flow of the solution in the longitudinal direction in the hollow portion 13a may be restrained by the damper action of the small bore b. Flow of the antifreezing solution A toward the opening B at one side of each hollow portion 13a caused by the vibration or the like of the machine body and such flow subsequently provokes shaking of the entire antifreezing solution A. As a whole, since provision is made such that the substantially whole float 13 is sank in the antifreezing solution and the shaking of the antifreezing solution contained in the container 10 is restrained, the float 13 is not unnecessarily shaken by the vibration or temporary inclination of the machine body. There is thus formed a machine body inclination detector device. That is, when either switch 15 is closed, there can be detected the change in position and position changing direction of the float 13 with respect to the machine body according to the inclination of the machine body. Thus, the inclination of the machine body by more than a predetermined angle and the inclination direction can be detected.

As shown in FIG. 2, the inclination detector device is interlocked with the control valve V of the cylinder 6 by circuit 21 so as to automatically operate the control valve V when both switches 15 are opened according to the inclination detection result of the detector device. Thus, in spite of transverse inclination of the tractor 1, a cultivating operation may be effected while maintaining left- and right-hand cultivating depths substantially constant.

It is to be noted that mere water or a mixed solution of water with the antifreeze solution A can also be used, instead of the antifreeze solution A.

In addition to polypropylene, various synthetic resins can be also used for making the float 13.

In order to form the retaining force of the float as small, the float may be formed so as to be sank in the antifreezing solution and supports for the portions to be detected 14 are vertically attached to the float with the volume of the supports being smaller than that of the float, such that the solution level is located adjacent these supports.

It is a matter of course that the present invention can be applied as a detector device for detecting the inclination or pitching angle of the machine body of a cart or construction machinery of every kind.

We claim:

1. A machine body inclination detector device comprising:
   a container adapted to be fixed to said machine body for containing a liquid;
   a float in said container for floating substantially sunken in said liquid and having horizontal longitudinally extending spaces therein communicating with the liquid in said container through holes extending between said spaces and at least one surface of said float and
   means for detecting the inclination of said float.

2. A device as in claim 1 wherein holes extend from the upper and lower surfaces of said float to said spaces.

3. A device as in claim 1 wherein said float has convex shaped ends in the plan view and said container has adjacent inner corners of concave shape.

4. A device as in claim 1 wherein said float includes a detectable portion at each end of said float on the upper surface thereof and said detecting means includes proximity switches mounted adjacent each said portion.

5. A device as in claim 4 wherein said float has a buoyancy such that only said portions project above said liquid.

6. A device as in claim 1 including at least a pair of spaces separated by a partition having an opening therethrough for limiting the rate of flow between said spaces.

7. A device as in claim 1 wherein said float has a weight therein adjacent each end.

8. A device as in claim 1 wherein said liquid is antifreeze and said device including said liquid.

9. A device as in claim 1 wherein said float is polypropylene.

* * * * *